United States Patent
Meylan

(10) Patent No.: US 9,609,557 B2
(45) Date of Patent: *Mar. 28, 2017

(54) OPTIMIZING IN-ORDER DELIVERY OF DATA PACKETS DURING WIRELESS COMMUNICATION HANDOVER

(71) Applicant: QUALCOMM Incorporated, San Diego, CA (US)

(72) Inventor: Arnaud Meylan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 388 days.

This patent is subject to a terminal disclaimer.

(21) Appl. No.: 14/283,813

(22) Filed: May 21, 2014

(65) Prior Publication Data
US 2014/0254556 A1    Sep. 11, 2014

Related U.S. Application Data

(63) Continuation of application No. 12/191,221, filed on Aug. 13, 2008, now Pat. No. 8,767,739.
(Continued)

(51) Int. Cl.
*H04W 36/02*    (2009.01)
*H04L 1/18*    (2006.01)
(Continued)

(52) U.S. Cl.
CPC ......... *H04W 36/023* (2013.01); *H04L 1/1841* (2013.01); *H04L 47/34* (2013.01); *H04L 69/321* (2013.01); *H04W 36/02* (2013.01)

(58) Field of Classification Search
CPC .. H04W 36/023; H04W 36/02; H04L 69/321; H04L 47/34; H04L 1/1841
(Continued)

(56) References Cited

U.S. PATENT DOCUMENTS

| 4,975,952 A | 12/1990 | Mabey et al. |
| 6,126,310 A | 10/2000 | Osthoff et al. |

(Continued)

FOREIGN PATENT DOCUMENTS

| CN | 1960561 A | 5/2007 |
| CN | 1984437 A | 6/2007 |

(Continued)

OTHER PUBLICATIONS

3GPP TS 36.300 V8.1.0(Jun. 2007),3rd Generation Partnership Project;Technical Specification Group Radio Access Network;Evolved Universal Terrestrial Radio Access (E-UTRA) and Evolved Universal Terrestrial Radio Access Network (E-UTRAN); Overall description; Stage 2 (Release 8)pp. 1-106.
(Continued)

*Primary Examiner* — Obaidul Huq
(74) *Attorney, Agent, or Firm* — Nerrie M. Zohn

(57) ABSTRACT

Systems and methodologies are described that facilitate processing service data units (SDU) in-order during communication handover in wireless networks. In particular, for mobile devices using re-transmission schemes, SDUs can be processed in-order by indicating to a target base station an index of a last SDU received in-order before handing off communication to the target base station. Additionally, SDUs received subsequent to one or more non-acknowledged SDUs can be forwarded to the target base station. Utilizing this information, the target base station can determine one or more SDUs the mobile device is preparing to re-transmit and can wait for this SDU before processing subsequently received SDUs. Also, a timer can be utilized to end a waiting period for the SDU.

21 Claims, 11 Drawing Sheets

Related U.S. Application Data

(60) Provisional application No. 60/955,607, filed on Aug. 13, 2007.

(51) Int. Cl.
*H04L 12/801* (2013.01)
*H04L 29/08* (2006.01)

(58) Field of Classification Search
USPC .......................................................... 370/229
See application file for complete search history.

(56) References Cited

U.S. PATENT DOCUMENTS

| | | | |
|---|---|---|---|
| 6,314,095 | B1 | 11/2001 | Loa |
| 7,600,040 | B1 | 10/2009 | Henry et al. |
| 8,767,739 | B2 | 7/2014 | Meylan |
| 2002/0095635 | A1 | 7/2002 | Wager et al. |
| 2002/0181422 | A1 | 12/2002 | Parantainen et al. |
| 2003/0002460 | A1 | 1/2003 | English |
| 2003/0128705 | A1 | 7/2003 | Yi et al. |
| 2005/0094586 | A1 | 5/2005 | Zhang et al. |
| 2005/0213555 | A1 | 9/2005 | Eyuboglu et al. |
| 2006/0126567 | A1 | 6/2006 | Chao et al. |
| 2006/0146751 | A1 | 7/2006 | Obuchi et al. |
| 2007/0153742 | A1 | 7/2007 | Sebire et al. |
| 2007/0167163 | A1 | 7/2007 | Horn et al. |
| 2007/0286125 | A1 | 12/2007 | Lee et al. |
| 2007/0291695 | A1 | 12/2007 | Sammour et al. |
| 2007/0293254 | A1* | 12/2007 | Jiang ............... H04L 1/187 455/466 |
| 2008/0019320 | A1 | 1/2008 | Phan et al. |
| 2008/0019332 | A1 | 1/2008 | Oswal et al. |
| 2008/0045217 | A1 | 2/2008 | Kojima |
| 2008/0298322 | A1* | 12/2008 | Chun ............... H04L 1/1635 370/335 |
| 2008/0310368 | A1 | 12/2008 | Fischer |
| 2009/0034476 | A1 | 2/2009 | Wang et al. |

FOREIGN PATENT DOCUMENTS

| | | |
|---|---|---|
| CN | 101035356 A | 9/2007 |
| CN | 101047953 A | 10/2007 |
| CN | 101207848 A | 6/2008 |
| EP | 1313250 A1 | 5/2003 |
| EP | 1507352 B1 | 1/2007 |
| JP | 2007013511 A | 1/2007 |
| JP | 2009521891 A | 6/2009 |
| JP | 2010525737 A | 7/2010 |
| RU | 2282943 C2 | 8/2006 |
| WO | 9826619 A2 | 6/1998 |
| WO | 2007078142 A1 | 7/2007 |
| WO | 2008133587 A1 | 11/2008 |

OTHER PUBLICATIONS

Ayanoglu E, et al., "Airmail: A Link-Layer Protocol for Wireless Networks",Wireless Networks, ACM, 2 Penn Plaza, Suite 701—NewYork USA,vol. 1, No. 1, Feb. 1, 1995 (Feb. 1, 1995), pp. 47-59, XP000503720,ISSN: 1022-0038, DOI: 10.1007IBF01196258.

Bakker J. D., et al., "Handover in a Virtual Cellular Network", Vehicular Technology Conference, 1999. VTC 1999—Fall. IEEE VTS 50th Amsterdam, Netherlands Sep. 19-22, 1999, Piscataway, NJ, US,IEEE, US, vol. 1, Sep. 19, 1999 (Sep. 19, 1999), pp. 544-548, XP010352898, ISBN: 978-0-7803-5435-7.

Ericsson: "Status reporting at Inter eNB mobility", 3GPP TSG-RAN WG2 #58-bis Tdoc R2-072559, Jun. 25, 2007, p. 1-4, URL, http://www.3gpp.org/ftp/tsg_ran/WG2_RL2/TSGR2_58bis/Docs/R2-072559.zip.

Ericsson: "User plane handling at mobility", 3GPP TSG-RAN WG2 #58 Tdoc R2-071822, May 7, 2007, p. 1-5, URL, http://www.3gpp.org/ftp/tsg_ran/WG2_RL2/TSGR2_58/Documents/R2-071822.zip.

Holma H et al., "HSDPA/HSUPA for UMTS: High Speed Radio Access for Mobile Communications (chapter 6)" 20060101, Jan. 1, 2006 (Jan. 1, 2006), p. 95-121, XP002514000.

International Search Report, PCT/US2008/073073—International Search Authority—European Patent Office, Mar. 23, 2009.

LG Electronics: "SDU Handling During Inter eNB Handover", 3GPP TSG-RAN WG2 #56, R2-063247, 3GPP, Nov. 10, 2006.

NEC: "Reordering of Downlink RLC SDU during Handovers," TSG-RAN WG2 #55, R2-052883, Oct. 2006 , pp. 1-3.

Pedersen, K. I. et al.: "Mobility management and capacity analysis for high speed downlink packet access in WCDMA," Vehicular Technology Conference, 2004. VTC2004-FALL. 2004 IEEE 60th Los Angeles, CA, USA Sep. 26-29, 2004, Piscataway, NJ, USA, IEEE, vol. 5, pp. 3388-3392 (Sep. 26, 2004) XP010787504 ISBN: 978-0-7803-8521-4.

Taiwan Search Report—TW097130899—TIPO—Feb. 4, 2013.

Toskala, A. et al.: "WCDMA for UMTS: Radio Access for Third Generation Mobile Communications, 3rd Ed (Chapter 11)—High-speed Downlink Packet Access," pp. 307-345 (Sep. 1, 2004), John Wiley & Sons, LTD., XP002513999 ISBN: 0-470-87096-6.

Written Opinion, PCT/US2008/073073—International Search Authority—European Patent Office, Mar. 23, 2009.

* cited by examiner

OPTIMIZING IN-ORDER DELIVERY OF DATA PACKETS DURING WIRELESS COMMUNICATION HANDOVER

CROSS-REFERENCE TO RELATED APPLICATIONS

This application is a Continuation Application of U.S. Ser. No. 12/191,221, filed Aug. 13, 2008, entitled "Optimizing In-Order Delivery of Data Packets During Wireless Communication Handover" which claims the benefit of U.S. Provisional Patent application Ser. No. 60/955,607, filed Aug. 13, 2007 entitled "Method And Apparatus For Optimizing In-Order Delivery Of Uplink Packets During Handoff In Communication Systems." The entirety of the aforementioned application is herein incorporated by reference.

BACKGROUND

I. Field

The following description relates generally to wireless communications, and more particularly to delivering sequenced service data units (SDU) to wireless communication devices.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. The antennas can relate to both base stations and mobile devices, in one example, allowing bi-directional communication between the devices on the wireless network. Mobile devices can travel about one or more wireless network service areas. To facilitate service access while moving, mobile devices can handover communications from one base station to another when moving within a specific range of the target base station. For the purpose of this description a handover may refer to a hand over of a communication from a base station to another base station as well as a hand over from and to the same base station. Further, the hand over may be initiated by the network or by the mobile terminal. The handover may also occur in order to support mobility of users in the wireless system, or to provide balancing of load, or to facilitate various reconfigurations of the connection or to facilitate handling of unforeseeable error cases. Additionally, mobile devices can employ re-transmission schemes, such as hybrid automatic repeat request (HARQ), to replicate delivery of data ensuring a higher probability of successful receipt.

In this regard, data packets can be delivered from a mobile device to a base station out-of-order, as a HARQ process re-transmits unsuccessful packets while it also continues to transmit new packets. Data packets can be re-ordered by an appropriate protocol following potentially unordered delivery. However, when communications are handed over from a source to a target base station, the sequencing of the packets by the appropriate protocol is facilitated at the target base station by providing information to the target base station about the sequence number of the first packet to expect.

SUMMARY

The following presents a simplified summary of one or more embodiments in-order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating determining a last consecutive packet received by a source base station and corresponding first missing packet before a handover. In particular, the target base station can receive packets following the last consecutive packet and an identifier of the last packet received and delivered in-order by the source base station. The identifier can be transmitted from the source base station or mobile device handing-over communication. Thus, if there are missing packet sequence numbers between the last packet received by the source base station and delivered in-order and the subsequent packets received, this can indicate an outstanding packet. The target base station can thus await transmission of the missing packet by the mobile device before ordering and analyzing the packets. In this regard, the target base station, upon receiving subsequent packets from the source base station, is notified of the missing packets, and waits to order and decode the packets until relevant packets are received or timed out.

According to related aspects, a method for ordering data packets during handover in wireless communication networks is provided. The handover may be network-initiated or terminal-initiated. The method can comprise receiving an index of a last service data unit (SDU) received in-order by a base station and obtaining one or more subsequent SDUs received by the base station. The method can further include determining one or more missing SDUs numbered between the index of the last SDU received in-order and the last of the one or more subsequent SDUs. Similarly the method can further include determining one or more missing SDUs numbered between, and including, the index of the first missing SDU in the received set of packets and the last of the one or more subsequent SDUs.

Another aspect relates to a wireless communications apparatus. The wireless communications apparatus can include at least one processor configured to receive a command for handing over communication of a mobile device from a source base station and determine one or more service data units (SDU) that are to be re-transmitted following handing over communication. The at least one processor is further configured to wait for the mobile device to transmit the one or more SDUs to be re-transmitted before expiration. The amount of time to wait may be based upon a timer or observed received sequence numbers. In one embodiment if received sequence number is larger than sequence number of missing packet, the at least one processor may stop waiting. of a wait timer. The wireless communications apparatus can also include a memory coupled to the at least one processor.

Yet another aspect relates to a wireless communications apparatus that facilitates processing data packets in-order upon handover in wireless communications networks. The wireless communications apparatus can comprise means for receiving a sequence index of a last service data unit (SDU) received in-order at a source base station. The wireless communications apparatus can additionally include means for determining one or more SDUs to be re-transmitted by a related mobile device based at least in part on the sequence index. Such retransmissions may be referred to as selective retransmissions.

Still another aspect relates to a computer program product, which can have a computer-readable medium including code for causing at least one computer to receive an index of a last SDU received in-order by an base station. The computer-readable medium can also comprise code for causing the at least one computer to receive one or more subsequent SDUs received by the base station. Moreover, the computer-readable medium can comprise code for causing the at least one computer to determine one or more missing SDUs numbered between the index of the last SDU received in-order and the earliest of the one or more subsequent SDUs.

According to a further aspect, a method for facilitating in-order delivery of data packets in wireless communication handover is presented. The method can include receiving at a mobile device a handover command for transferring communications to a target base station. Or the method can include the mobile device making an autonomous decision for a handover to a target base station. Independently of the trigger for the handover, the method can additionally include determining a sequence index of a last SDU received in-order from the mobile device and transmitting the sequence index to the target base station in response to a handover.

Another aspect relates to a wireless communications apparatus. The wireless communications apparatus can include at least one processor configured to issue a command for a handover of mobile device communications to a disparate wireless communications apparatus. The at least one processor can be further configured to obtain an index of a last SDU received in-order by the source base station from the mobile device. The index may be transmitted from a source base station to a target base station over a dedicated interface between the base stations, such as, for example, the X2 interface in 3GPP systems, or via the S1 interface if the X2 is not present. Another aspect relates to a wireless communication apparatus that can include at least one processor configured to identify the index of a last SDU received in-order from a mobile device as well as a list of SDUs received out of sequence from a mobile device. The at least one processor may be configured to transmit the index and out-of-sequence SDUs to a target base station over an X2, S1, or similar interface between base stations. The wireless communications apparatus can also include a memory coupled to the at least one processor.

Yet another aspect relates to a wireless communications apparatus for ordered processing of data packets during handover in wireless communication networks. The wireless communications apparatus can comprise means for determining a sequence index of a last service data unit (SDU) received in-order from a mobile device. The wireless communications apparatus can additionally include means for transmitting the sequence index to a disparate wireless communications apparatus in preparation or in response to the occurrence of a handover command related to the mobile device.

Still another aspect relates to a computer program product, which can have a computer-readable medium including code for causing at least one computer to receive a handover command related to a mobile device for transferring communications to a target base station. The computer-readable medium can also comprise code for causing the at least one computer to determine a sequence index of a last service data unit (SDU) received in-order from the mobile device. Moreover, the computer-readable medium can comprise code for causing the at least one computer to transmit the sequence index to the target base station in response to the handover command.

To accomplish the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
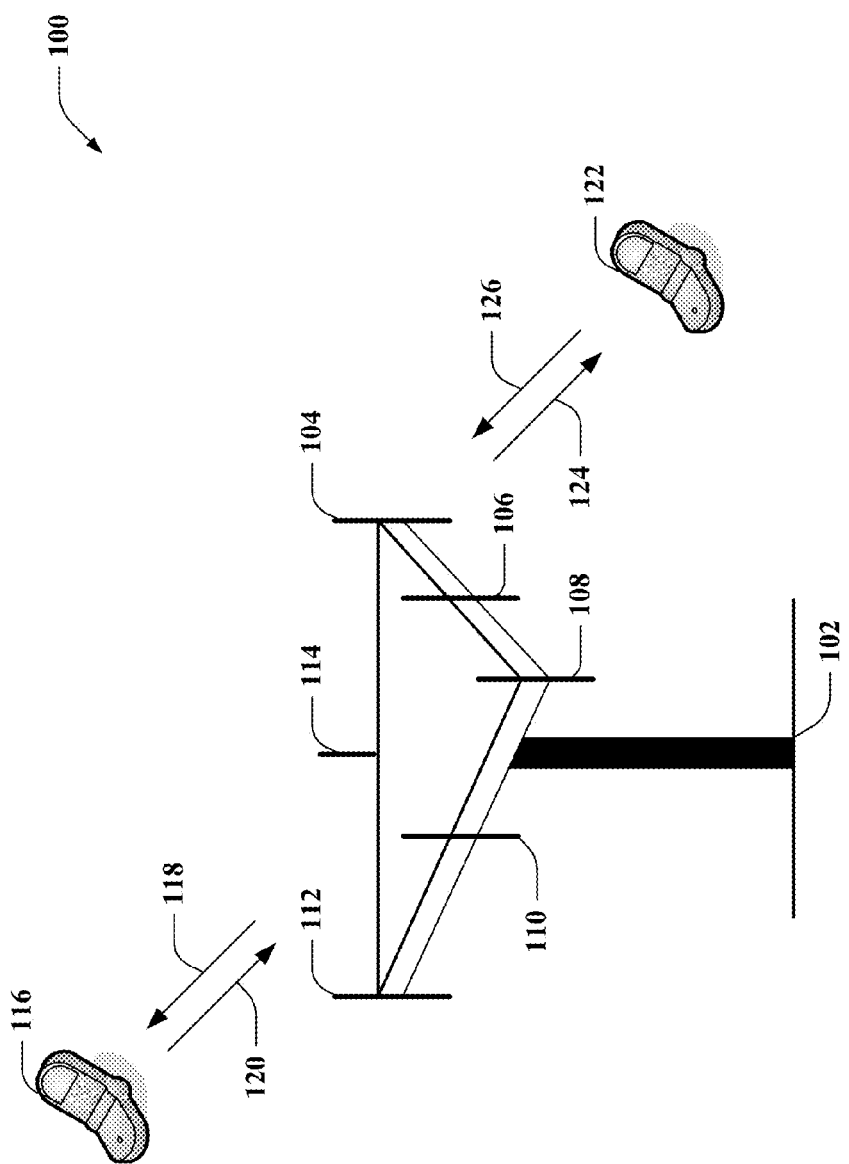
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in-order to provide a thorough understanding of one or more embodiments. It may be evident, however, that such embodiment(s) can be practiced without these specific details. In other instances, well-known structures and devices are shown in block diagram form in-order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS), home NodeB, home evolved Node B, wireless router or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology as depicted.

According to an example, system 100 can be a multiple-input multiple-output (MIMO) communication system. Further, system 100 can utilize substantially any type of duplexing technique to divide communication channels (e.g., forward link, reverse link) such as FDD, TDD, and the like. In one example, the mobile devices 116/122 can communicate with the base station 102 using a re-transmission scheme, such as hybrid automatic repeat request (HARQ), such that the mobile devices 116/122 can re-transmit service data units (SDU) that are not successfully received by the base station 102. For example, the base station 102 can transmit an acknowledgement (ACK) and/or non-ACK to notify the mobile device 116/122 of the receive status for the SDUs. The re-transmission scheme can, thus, re-transmit SDUs after subsequently indexed SDUs are received by the base station 102 where the base station 102 previously responded to receiving the re-transmit SDUs with a non-ACK. In this regard, when the correct SDUs are received after possible re-transmission, the base station 102 can order the SDUs according to a specified sequence number.

Moreover, the mobile devices 116/122 can communicate with the base station 102 while traveling in a geographic region. Upon moving within a given proximity of a target base station (not shown), mobile devices 116/122 can handover communication from the source base station 102 to the target base station. In one example, the source base station 102 can send a non-ACK in response to SDU transmission by a mobile device 116 and/or 122, which can mark the SDU for re-transmission. Before re-transmission, the mobile device 116 and/or 122 can transmit a subsequently indexed SDU to the base station 102 that can be successfully received (e.g., the source base station 102 transmits an ACK back to the device). Further in this example, the mobile device 116 and/or 122 can initiate a handover to the target base station, leaving an SDU in its re-transmission queue though a subsequent SDU was received by the source base station 102.

In this example, the target base station can receive an indication of the last SDU received and delivered in-order, which is the SDU before the one in the re-transmission queue in this example. Also, the target base station can receive the subsequently received SDU from the source base station 102. Thus, the target base station can determine, based on the index and the first received SDU, that an SDU is outstanding, and the target base station can await re-transmission of the SDU by the mobile device 116 and/or 122. It is to be appreciated that the index of the last SDU received and delivered in-order can be transmitted to the target base station by the source base station 102 and/or the mobile device 116 and/or 122 upon handover, in one example.

Figure 2:
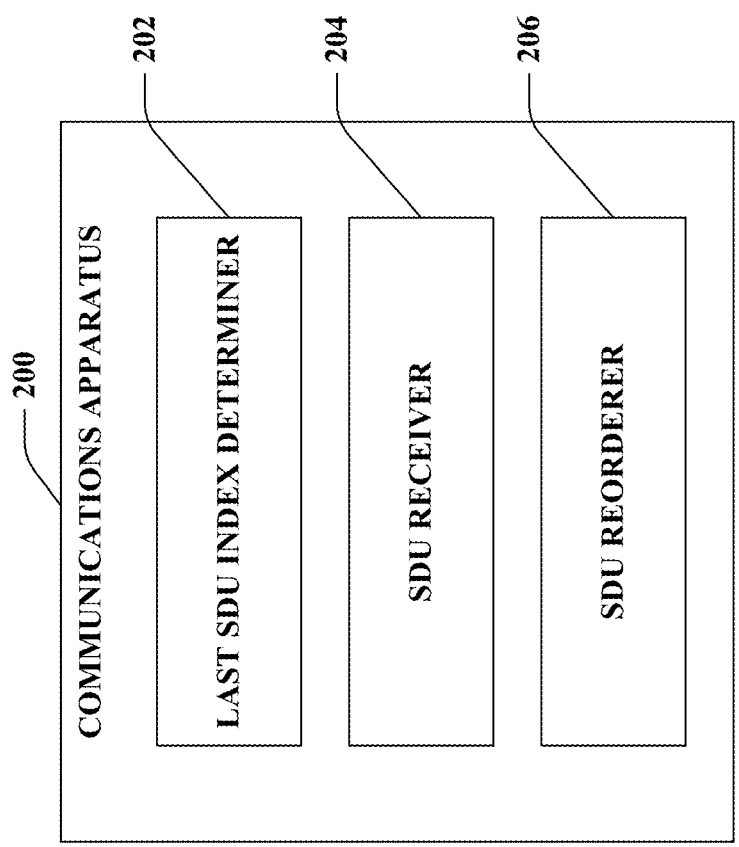
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. The communications apparatus 200 can include a last SDU index determiner 202 that obtains the index or sequence number of the last SDU received and delivered at the communication protocol of a mobile device or base station. The index may be determined at the time of a handover at apparatus 200. The communication protocol may be, for example, the E-UTRAN Radio Link Protocol (RLC as specified 3GPP TS 36.322) or E-UTRAN Packet Data Convergence Protocol (PDCP as specified in TS 36.323) or similar Internet Protocol adaptation layer. The communications apparatus 200 also includes an SDU receiver 204 that receives one or more SDUs from a mobile device or base station used previously to handover to the communications apparatus 200, as well as an SDU reorderer 206 that arranges SDUs according to respective sequence numbers for decoding data in the SDUs.

According to an example, the communications apparatus 200 can receive a handover request from a disparate communications apparatus (e.g., a source base station) to receive a communication from a mobile device (not shown) currently communicating with a disparate communications apparatus (not shown). According to another example, the communications apparatus 200 can accept a mobile device that autonomously hands over to the apparatus. Subsequent to either of the aforementioned events the communications apparatus 200 can also receive one or more SDUs transmitted by the mobile device to the disparate communications apparatus that were not processed by the disparate communications apparatus because a prior SDU was not yet successfully received. This prior SDU can be arranged for re-transmission by the mobile device, in this example, following the handover. Thus, the disparate communications apparatus will not receive re-transmission of the prior SDU and can, thus, transmit its subsequent SDUs to the communications apparatus 200 for processing.

The SDU receiver 204 can receive the one or more subsequent SDUs from the disparate communications apparatus. It will be appreciated that the mobile device and/or another device can transmit the subsequent SDUs to the communications apparatus 200 as well; moreover, the transmission can be in response to a request from the communications apparatus 200 in one example. In an example, the communications apparatus 200 may request transmission of only the missing SDUs from the mobile terminal based on the index of the last SDU received in sequence (or the index of the first missing SDU) as well as the one or more SDUs received out-of-sequence from the source base station. The communications apparatus 200 can compare the index obtained by the last SDU index determiner 202 to the one or more subsequent SDUs received by the SDU receiver 204 to determine whether the one or more subsequent SDUs received can be delivered to upper layers immediately or if there are one or more preceding SDUs in the re-transmission or HARQ queue of the mobile device. This can be determined where sequence numbers are missing between the index and first subsequent SDU received. If such a discrepancy exists, the communications apparatus 200 can await the mobile device to re-transmit the prior SDU. Once the prior SDU(s) is/are transmitted by the mobile device to the communications apparatus 200 (or once a wait timer has expired in one example) such that the communications apparatus 200 has received sequenced SDUs, the SDU reorderer 206 can order the SDUs according to sequence allowing the communications apparatus 200 to deliver the SDUs to the upper layer in sequence and without gaps in the sequence. If the wait timer expires, the communications apparatus 200 may deliver in sequence but with gaps.

Figure 3:
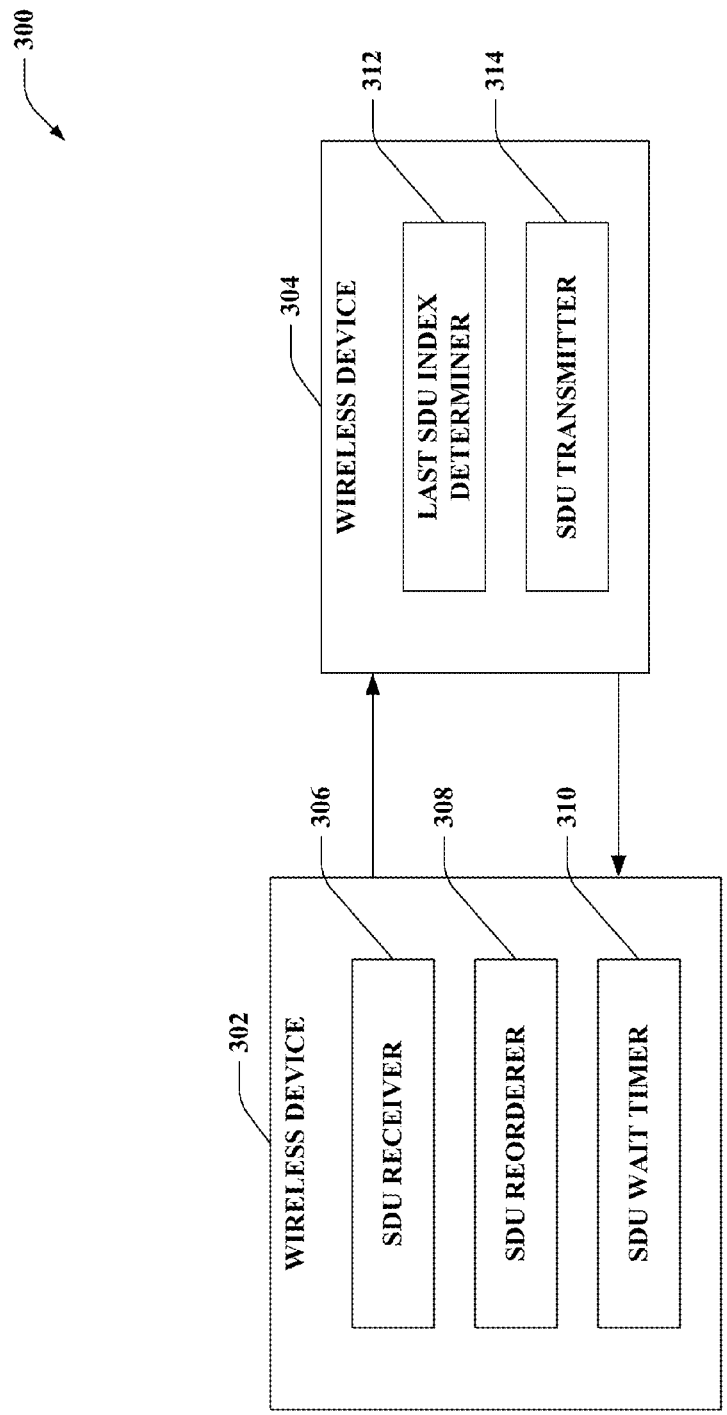
FIG. 3 is an illustration of an example wireless communications system that effectuates in-order processing of service data units (SDU) during handover.

Now referring to FIG. 3, illustrated is a wireless communications system 300 that can sequence SDUs received and delivered out-of-order in wireless communication system, for instance, as may happen during a handover or re-establishment of the lower protocol layers, or terminal initiated mobility such as forward handover or radio link failure recovery or handover failure recovery. Each wireless device 302 and 304 can be a base station, mobile device, or portion thereof. In one example, wireless device 302 can transmit information to wireless device 304 over a forward link or downlink channel; further wireless device 302 can receive information from wireless device 304 over a reverse link or uplink channel. Moreover, system 300 can be a MIMO system, and the wireless devices 302 and 304 can communicate on a radio link control (RLC) layer that transforms service data into protocol data for transmission over a protocol layer, such as PDCP. Also, the components and functionalities shown and described below in the wireless device 302 can be present in the wireless device 304 as well and vice versa, in one example; the configuration depicted excludes these components for ease of explanation.

Wireless device 302 includes an SDU receiver 306 that can receive SDUs from wireless device 304 and/or other wireless devices (not shown), an SDU reorderer 308 that can sequentially arrange SDUs received out of sequence, and an SDU wait timer 310 that can specify an amount of time to await re-transmission of SDUs not received by the wireless device 304 while in communication with a previous wireless device for which a handover command is received. Wireless device 304 can include a last SDU index determiner 312 that can obtain the index of a last SDU received and delivered in-order prior to a handover from the wireless device 304 to the wireless device 302 as well as an SDU transmitter 314 that can transmit SDUs received by the wireless device 304 for which one or more prior indexed SDUs were not successfully received by the wireless device 304. The SDU transmitter 314 is capable of forwarding SDUs over a network interface such as, for example, the aforementioned X2 interface or S1 interface. It will be appreciated that the transmitted SDUs can be stored at the wireless device 304 (e.g., in a buffer) while awaiting a re-transmission of a missing sequence numbered SDU. Additionally, it will be appreciated that missing sequence numbered SDUs need not be the result of failed transmission; rather, in one example, parallel transmission using multiple antennas, or multiple HARQ processes, can be utilized where SDUs can be received out of sequence due to independent transmission.

According to an example, the wireless device 304 can communicate with a mobile device (not shown) providing wireless access services thereto. The mobile device can communicate with the wireless device 304 using HARQ, ARQ or other re-transmission scheme such that SDUs can be re-transmitted to the wireless device 304 following subsequently indexed SDUs to promote successful delivery of the SDUs. In one example, the mobile device can request a handover to the wireless device 302, or the wireless device 304 can request a handover on behalf of the mobile device where one or more SDUs are in the re-transmit queue of the mobile device. Following the handover request, the wireless device 302 can begin receiving SDUs from the mobile device.

In this case, however, where there is an outstanding SDU to be re-transmitted by the mobile device, the last SDU index determiner 312 can transmit the index of the last SDU received and delivered in-order to the wireless device 302. Additionally, where the mobile device has transmitted additional SDUs indexed subsequent to the SDU to be re-transmitted, the SDU transmitter 314 can transmit the SDUs to the wireless device 302, which can receive the SDUs from a network interface via SDU receiver 306. The mobile device can be informed by SDU receiver 306 about a missing SDU in need of retransmission based on the index of the last SDU received and the additional SDUs indexed subsequent to the SDU to be re-transmitted. When not informed, the mobile can retransmit all SDUs starting from the last known received in sequence by wireless device 304. As there is an outstanding SDU in the re-transmit queue of the mobile device in this example, the SDU wait timer 310 can be set to establish a time at which the wireless device 302 can determine the re-transmit has timed out or that the wireless device 302 otherwise does not expect to receive the re-transmit SDU.

Once the wireless device 302 receives the SDU or the SDU wait timer 310 expires, for example, the SDU reorderer 308 can arrange the SDUs sequentially to interpret data within one or more SDUs and deliver an ordered stream of packets to the upper layer, such as the internet protocol (IP). In one example, the wireless device 302 can be an base station in a wireless communications network, and the wireless device 304 can be a disparate base station to which communication with a mobile device is handed over. In another example, the wireless device 304 can be a mobile device handing over communication from a base station to the wireless device 302. Thus, the mobile device can transmit the index to the wireless device 302 via the last SDU index determiner 312 as well as subsequent SDUs via the SDU transmitter 314, in one example.

Figure 4:
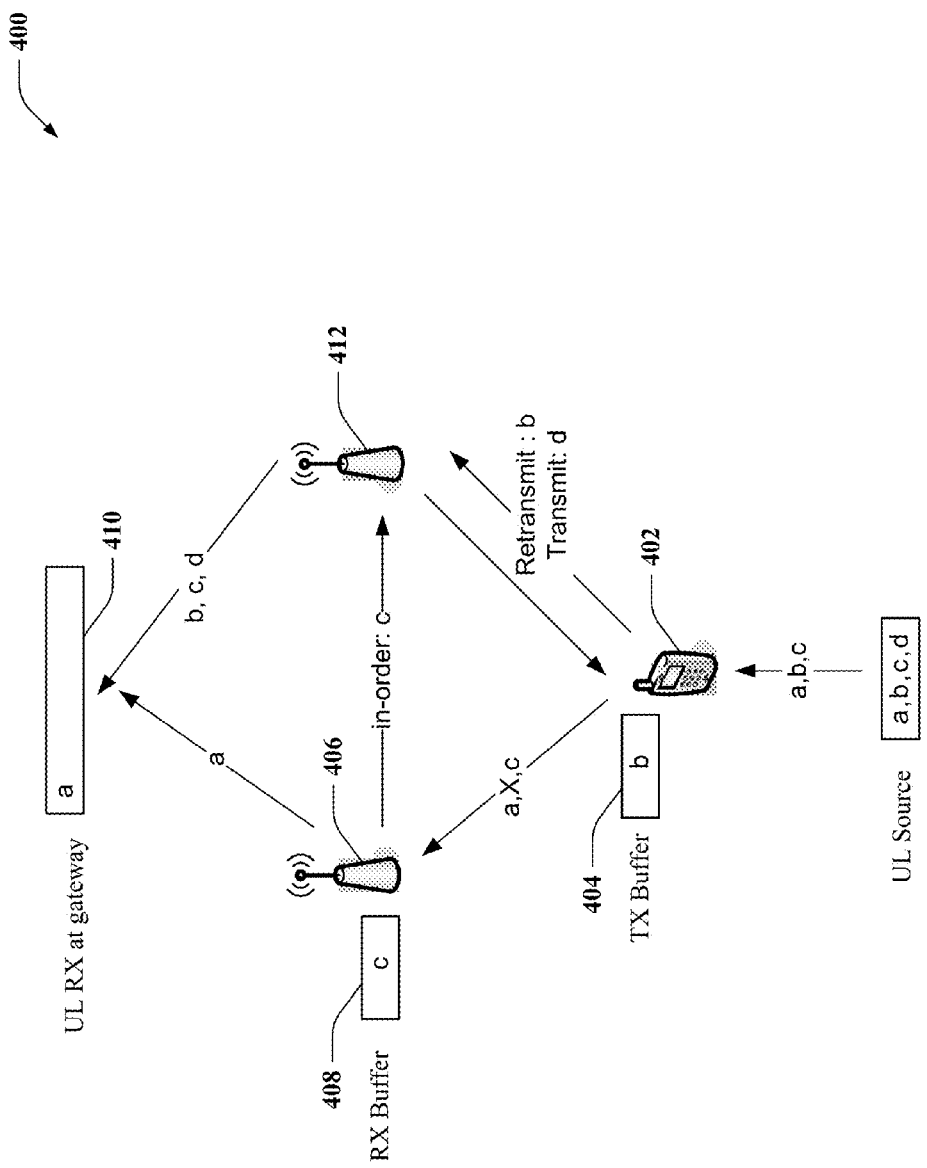
FIG. 4 is an illustration of an example wireless communication system that displays sample message passing to process SDUs in-order during handover.

Turning now to FIG. 4, illustrated is an example wireless communications network 400 that facilitates in-order delivery of SDUs in wireless communication handover. A mobile device 402 is provided that communicates SDUs over a protocol layer (which can use a RLC or a PDCP, for example) to one or more base stations 406 and/or 412. In the example depicted, the mobile device 402 can communicate sequenced SDUs a, b, and c to base station 406. However, base station 406 receives only a and c successfully and transmits a negative-ACK for b, where the negative receipt is indicated by the X. As described, mobile device 402 can utilize a re-transmission scheme, such that b can be stored in a transmit buffer 404 of the mobile device 402 for subsequent re-transmission. The base station 406 upon successfully receiving a and c can store a in an uplink receive buffer 410 or otherwise process SDU a. However, the base station 406 waits for b before processing c, and thus stores c in a receive buffer 408.

According to this example, before SDU b is successfully received by base station 406 via re-transmission from mobile device 402, a handover of mobile device 402 communication from base station 406 to base station 412 occurs. As indicated, this can result when mobile device 402 comes within a specified proximity of base station 412 additional services offered by the base station, re-selection by mobile terminal and/or the like. Since mobile device 402 now communicates with base station 412, the re-transmission of SDU b will go to base station 412 since base station 406 no longer processes SDUs from the mobile device 402. However, if base station 412 immediately begins processing SDUs from mobile device 402, it may receive re-transmitted SDUs out-of-order, and the resulting SDUs may never be processed. Thus, the mobile device 402 and/or base station 406 can determine the index of the last SDU received and delivered in-order, which is a in this case. In addition, base station 406 may also indicate with appropriate signaling that sequence numbers up to and including 'a' are received, and additionally that 'c' is also received to facilitate the mobile terminal decision to retransmit only 'b', and then proceed with transmission of 'd'.

Once determined, the index can be transmitted to the base station 412 along with subsequently received SDUs, which includes SDU c in this example. The base station 412 can utilize this to determine that between the index of SDU a and SDU c, SDU b has not been received. Thus, base station 412 can await SDU b to be re-transmitted from the mobile device 402. As shown, the mobile device 402 transmits SDU b along with a new SDU d to the base station 412. Upon receiving SDU b, the base station 412 can order and process the SDUs b and c as well as newly acquired SDU d. In addition, as indicated by the arrow from base station 412 to base mobile device 402, base station 412 may indicate with appropriate signaling that at least sequence numbers 'a' and 'c' are received. Thus, in-order delivery and processing of SDUs during handover of communication is achieved as shown above.

Figure 5:
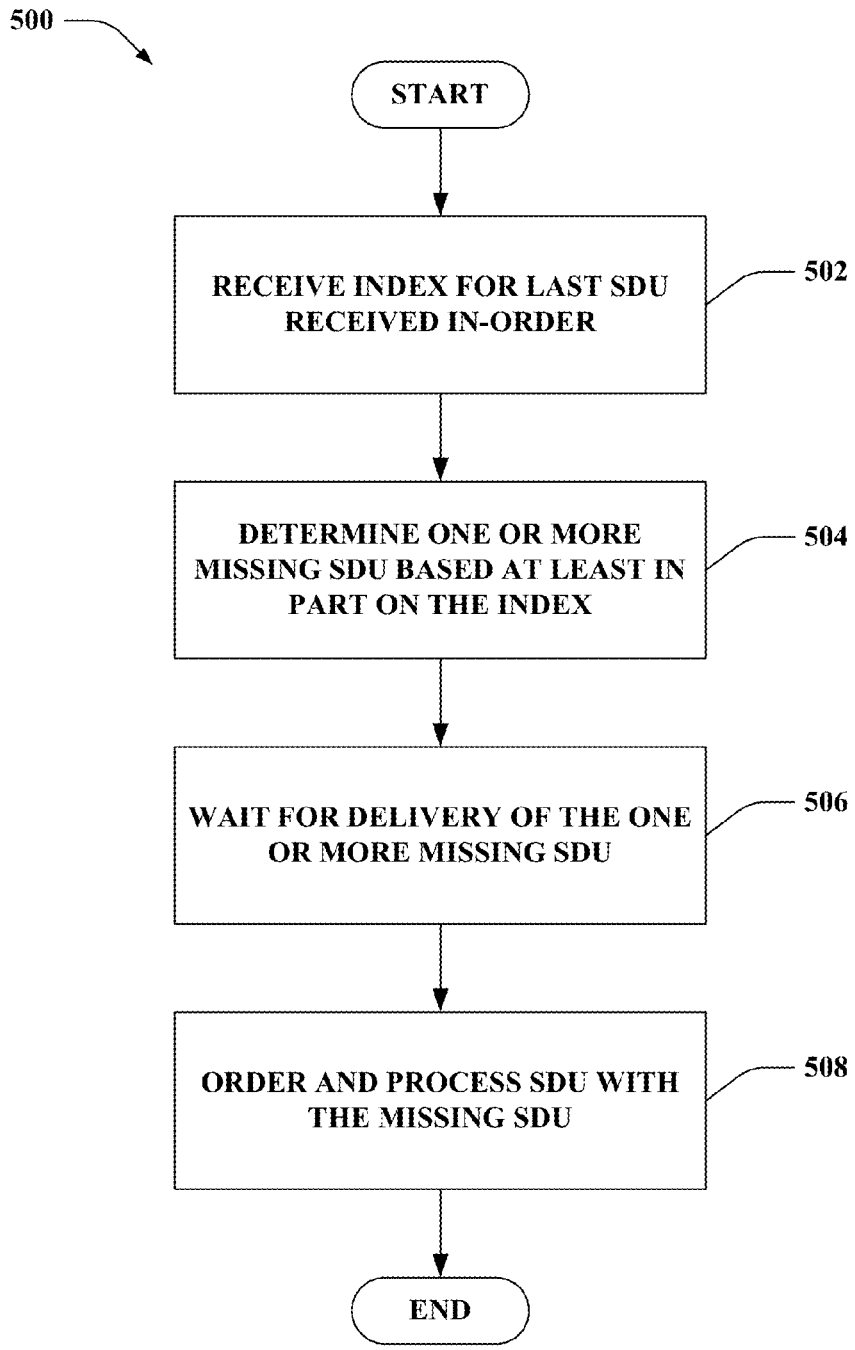
FIG. 5 is an illustration of an example methodology that facilitates determining SDUs that are to be re-transmitted by a mobile device.
Figure 6:
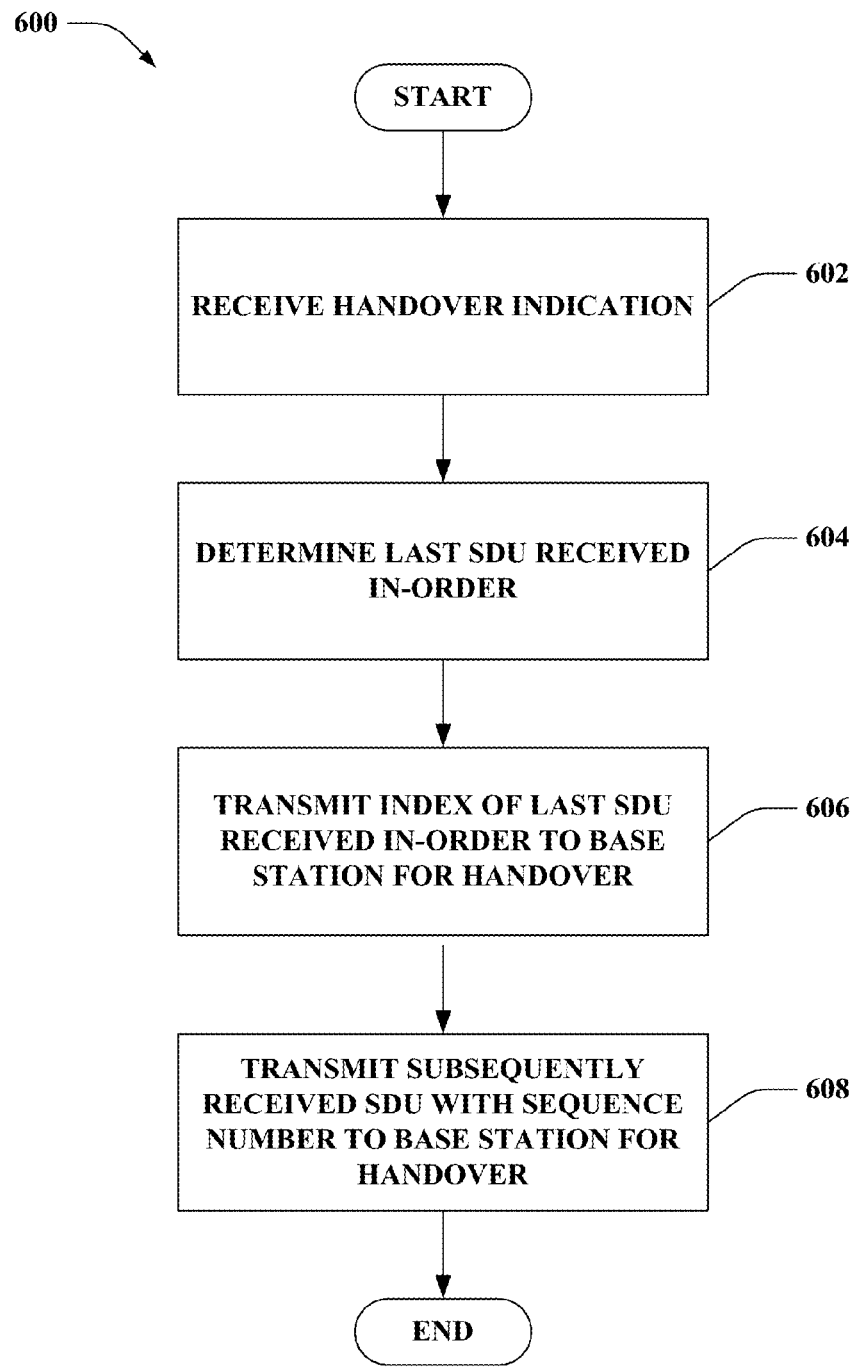
FIG. 6 is an illustration of an example methodology that facilitates transmitting data to a target base station on handover indicating the last SDU received in-order.

Referring to FIGS. 5-6, methodologies relating to in-order processing of SDUs during wireless communication handover are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, a methodology 500 that facilitates ordered processing of SDUs in wireless communication handover is displayed. At 502, an index for the last SDU received in-order is received. In one example, this can be received from a source base station in response to a handover command. The index identifies the last SDU received from a mobile device where the mobile device has an outstanding SDU in its re-transmit queue, for example. At 504, one or more missing SDUs are determined based at least in part on the index. As described, subsequent SDUs can be received; thus, missing SDUs can be determined by evaluating the received index along with indices of the subsequent SDUs received.

At 506, waiting occurs for delivery of the one or more missing SDUs. In one example, since the missing SDUs are identified, waiting can occur until the mobile device transmits the missing SDUs from its re-transmit queue. In another example, a timer can be utilized in the waiting such that upon expiration, received SDUs can be ordered and processed without having received the missing SDUs. At 508, if the missing SDUs are delivered, the SDUs are ordered and processed with the missing SDUs, as soon as they become available. In this regard, data included in the SDUs can be delivered to upper layers in-order, for example.

Turning to FIG. 6, illustrated is a methodology 600 that transmits information during wireless device communication handover to facilitate in-order processing of SDUs. At 602, a handover indication is received; this can be from a mobile device or base station and can be in response to a mobile device moving about a geographic region, for example. At 604, the last SDU received in-order from the mobile device is determined. For example, a negative-ACK can be transmitted for a received SDU such that the immediately preceding SDU that is successfully received is determined to be the last SDU received in-order. Alternatively, an ACK can be transmitted for all SDUs preceding. At 606, the index of the last SDU received in-order (or, alternatively, the index of first missing SDU) can be transmitted to a base station to facilitate handover of mobile device communication as described previously. In addition, at 608, subsequently received SDU along with its sequence number can be transmitted to the base station for handover as well. For example, the SDUs can be deciphered and header-decompressed.

It will be appreciated that, in accordance with one or more aspects described herein, inferences can be made regarding determining SDUs to be re-transmitted during or following handover as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In one example, inferences can be made in determining whether there are SDUs outstanding in a mobile device re-transmit queue upon handing over communications. For example, different heuristics can be utilized in this regard, and the proper heuristics can be inferred. In one example, as described, sequence numbers can be utilized to determine existence or non-existence of an SDU. Additionally or alternatively, a time stamp can be similarly utilized in this regard. Also, SDUs can be decoded to determine if a previous SDU is needed for enhance or successful decoding in one example.

Figure 7:
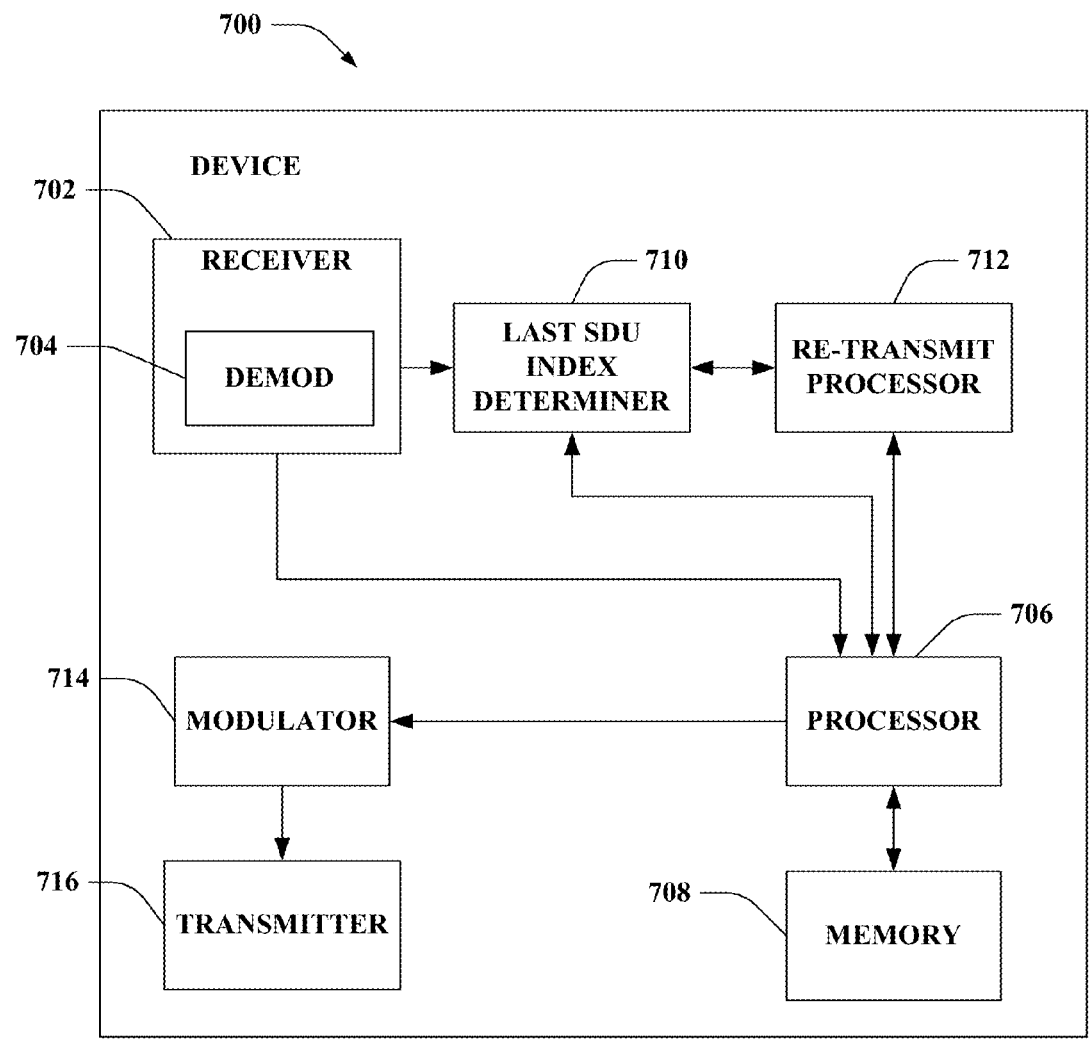
FIG. 7 is an illustration of an example mobile device that facilitates transmitting an index of the last SDU received in-order.

FIG. 7 is an illustration of a device 700 that facilitates determining a last SDU index received in-order. device 700 comprises a receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of device 700, and/or a processor that both analyzes information received by receiver 702, generates information for transmission by transmitter 716, and controls one or more components of device 700.

Device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Processor 706 and/or receiver 702 can further be operatively coupled to a last SDU index determiner 710 that can determine an index of an SDU successfully received immediately prior to a non-acknowledged SDU. The processor 706 can additionally be coupled to a re-transmit processor 712 that can re-transmit SDUs which are not successfully received at an base station (e.g., a non-ACK is received from the base station). The re-transmit processor 712 can be a HARQ processor and/or the like. According to an example, the last SDU index determiner 710 can obtain the index of the last SDU received in-order by evaluating a queue of the re-transmit processor 712. If there is an SDU in the re-transmit processor 712 queue, the index of the last SDU received in-order can be one index unit subtracted from the index of the re-transmit SDU, for example. Device 700 may further comprise a modulator 714 and transmitter 716 that respectively modulate and transmit signal to, for instance, a base station, another device, etc. Although depicted as being separate from the processor 706, it will be appreciated that the last SDU index determiner 710, re-transmit processor 712, demodulator 704, and/or modulator 714 can be part of the processor 706 or multiple processors (not shown).

Figure 8:
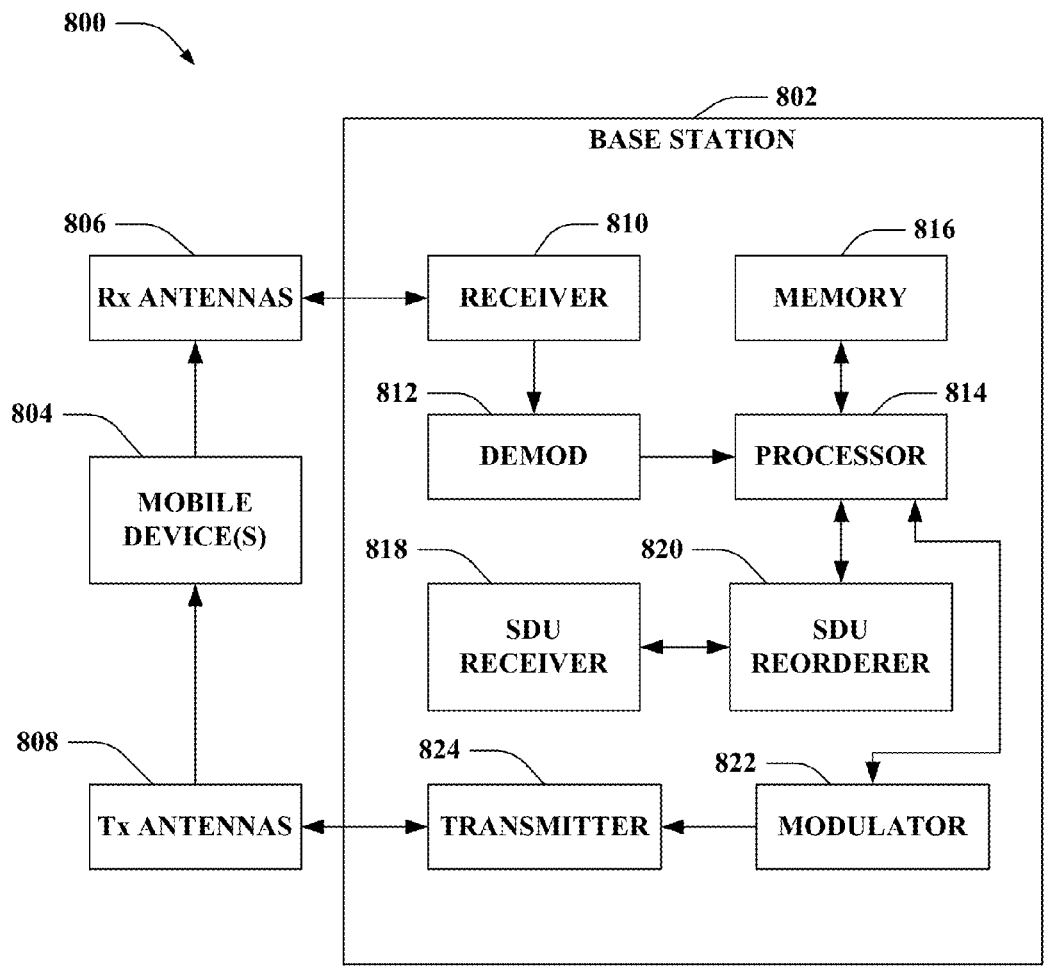
FIG. 8 is an illustration of an example system that determines the last SDU received in-order for processing of the SDUs.

FIG. 8 is an illustration of a system 800 that facilitates ordering SDUs during wireless communication handover using re-transmission. The system 800 comprises a base station 802 (e.g., access point, . . . ) with a receiver 810 that receives signal(s) from one or more mobile devices 804 through a plurality of receive antennas 806, and a transmitter 824 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a SDU receiver 818 that receives SDUs from disparate base stations as described above as well as mobile device(s) 804 upon communication handover to the base station. Processor 814 is further coupled to a SDU reorderer 820 that can arrange received SDUs from disparate base stations upon handover as well as mobile devices during re-transmission.

According to an example, one or more mobile devices 804 can handover communications to the base station 802 from a source base station (not shown). Upon handover, the mobile device(s) 804 can transmit SDUs on an RLC layer to the base station 802, which can be received by the SDU receiver 818; however, as described herein, the mobile device(s) 804 can have re-transmit SDUs in its queue from previous communication with the source base station. In this regard, the mobile device(s) 804 and/or the source base station can transmit an index for the last SDU received by the source base station in-order (e.g., before the SDU in the re-transmit queue). In addition, the source base station and/or mobile device(s) 804 can transmit subsequent SDUs to the base station 802. The SDU receiver 818 can receive the subsequent SDUs as well as the index of the last SDU received in-order.

The base station 802 can then determine one or more SDUs missing between the sequence starting with the index and ending with the first subsequent SDU. If SDUs are missing in this regard, the base station 802 can wait for the mobile device(s) 804 to re-transmit the appropriate SDU, such as part of a HARQ re-transmission for example. In addition, the base station 802 can set a timer for receiving the missing SDU and continue without it if the timer expires. In either case, the SDU reorderer 820 can arrange the SDUs for processing thereof. Furthermore, although depicted as being separate from the processor 814, it is to be appreciated that the SDU receiver 818, SDU reorderer 820, demodulator 812, and/or modulator 822 can be part of the processor 814 or multiple processors (not shown).

Figure 9:
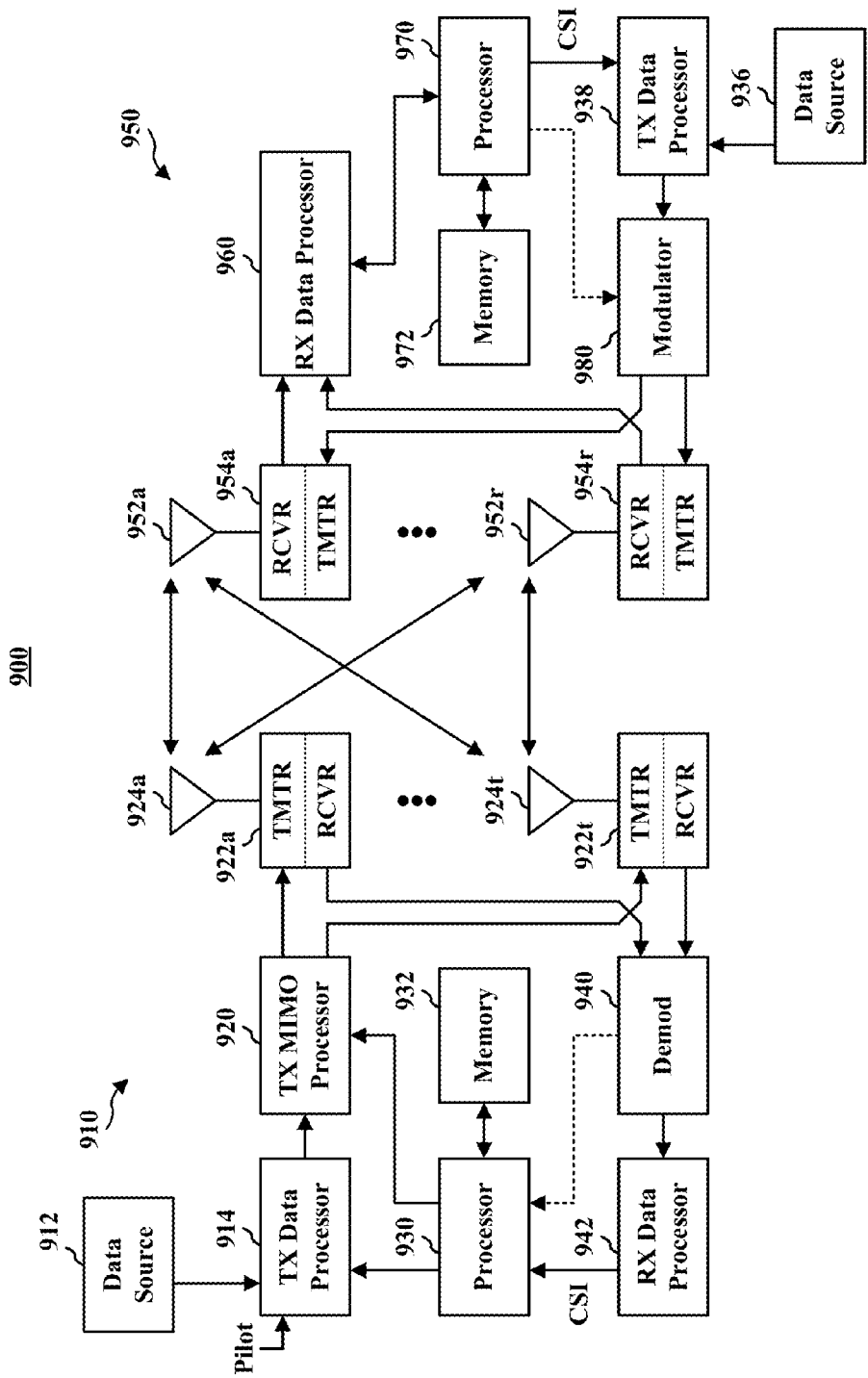
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-3 and 7-8), configurations (FIG. 4), and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which precoding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
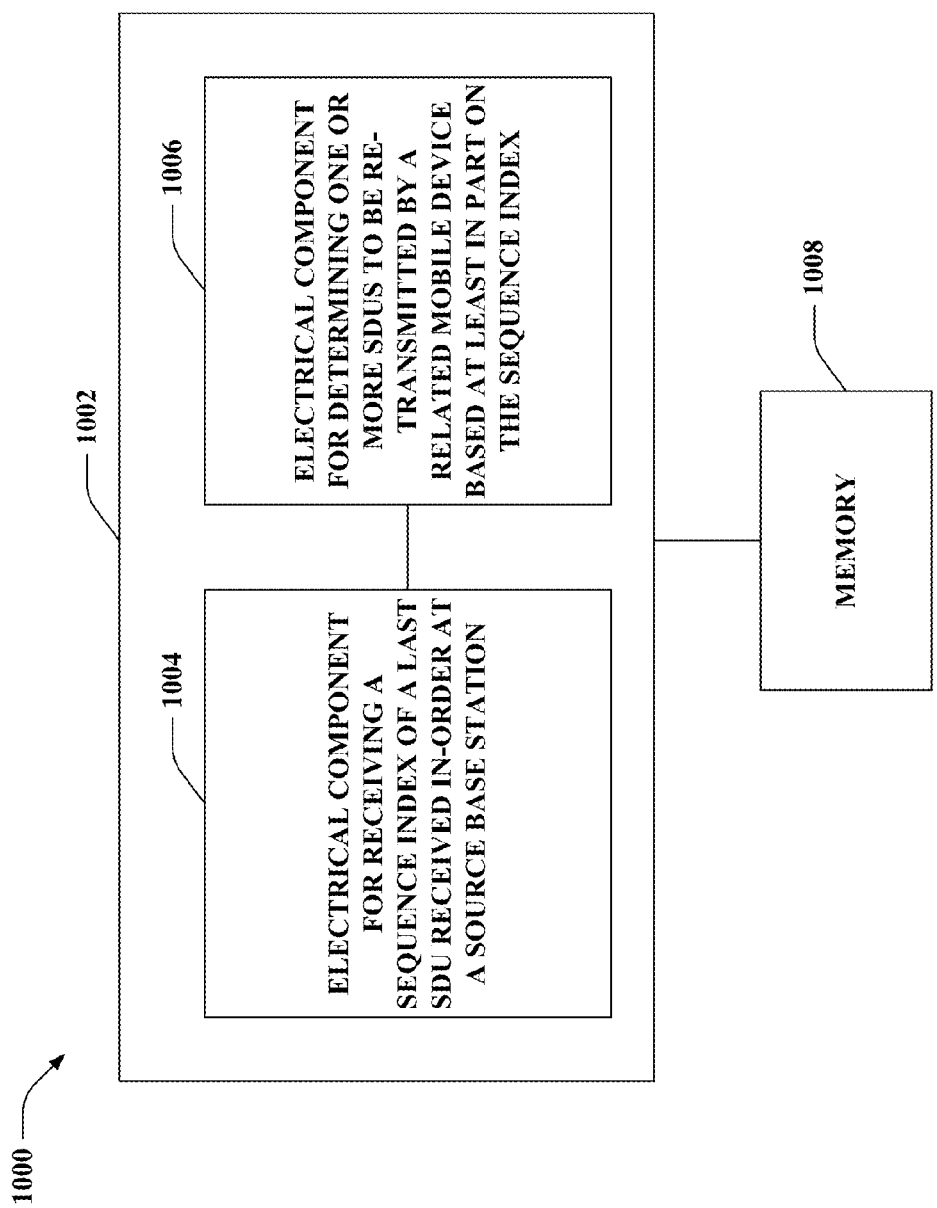
FIG. 10 is an illustration of an example system that determines one or more missing SDUs upon communication handover.

With reference to FIG. 10, illustrated is a system 1000 that determines SDUs to be re-transmitted by a mobile device during wireless communication handover. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for receiving a sequence index of a last SDU received in-order at a source base station 1004. For example, the index can relate to the last successfully received SDU without interruption (e.g., without requiring re-transmission), or the index can be received by means of radio signaling. In addition, this can occur during handover when a mobile device can be in the middle of re-transmitting one or more SDUs. Further, logical grouping 1002 can comprise an electrical component for determining one or more SDUs to be re-transmitted by a related mobile device based at least in part on the sequence index 1006. Thus, as described, the index can relate to the last successfully received and processed SDU in sequence; thus, the index combined with subsequent SDUs transmitted to the system 1000 can be utilized to determine missing SDUs set for re-transmission in the mobile device. Additionally, system 1000 can include a memory 1008 that retains instructions for executing functions associated with electrical components 1004 and 1006. While shown as being external to memory 1008, it is to be understood that one or more of electrical components 1004 and 1006 can exist within memory 1008.

Figure 11:
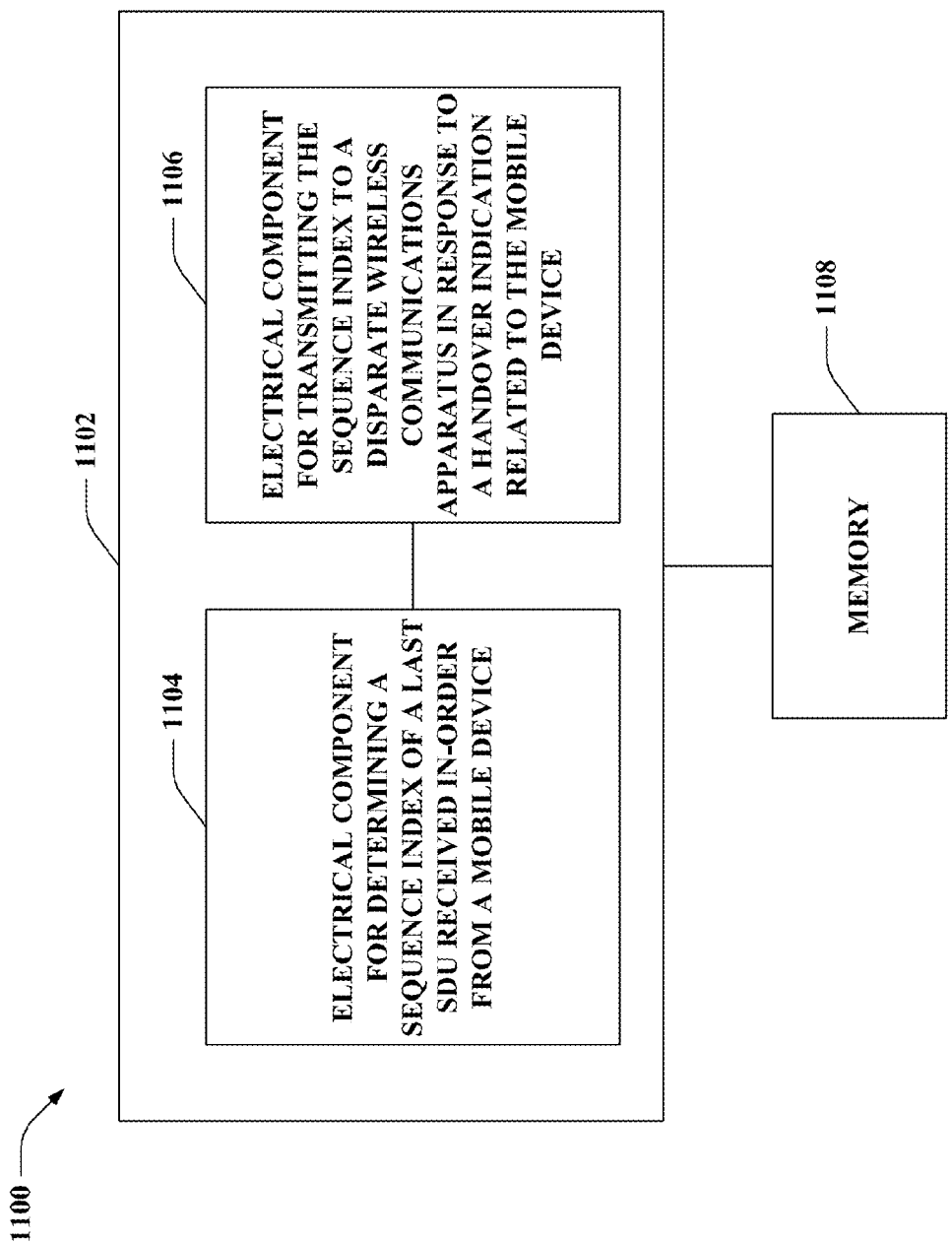
FIG. 11 is an illustration of an example system that transmits data related to one or more SDUs in a re-transmit queue for in-order processing upon handover.

Turning to FIG. 11, illustrated is a system 1100 that transmits a sequence index of a last SDU received in-order to facilitate sequential processing of SDUs in a wireless communications network during handover. System 1100 can reside within a base station, mobile device, etc., for instance. As depicted, system 1100 includes functional blocks that can represent functions implemented by a processor, software, or combination thereof (e.g., firmware). System 1100 includes a logical grouping 1102 of electrical components that facilitate transmitting relevant information to a target system for handover. Logical grouping 1102 can include an electrical component for determining a sequence index of a last SDU received in-order from a mobile device 1104. As described, this is the last SDU received before a non-ACK is transmitted to the mobile device. This can be subsequently used, as described, to determine SDUs to be re-transmitted by the mobile device. Moreover, logical grouping 1102 can include an electrical component for transmitting the sequence index to a disparate wireless communications apparatus in response to a handover indication related to the mobile device 1106. Thus, upon receiving a request for handover, the index can be determined to allow the target system to determine which SDUs are to be expected from the mobile device. Additionally, system 1100 can include a memory 1108 that retains instructions for executing functions associated with electrical components 1104 and 1106. While shown as being external to memory 1108, it is to be understood that electrical components 1104 and 1106 can exist within memory 1108.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of data packet management associated with a handover of a mobile device to a target base station in wireless communication networks, comprising:
receiving, from a source base station, an indication of a first missing service data unit (SDU), wherein the first missing SDU is subsequent to a last SDU received in-order at the source base station from a mobile device;
receiving, from the source base station, an indication of two or more subsequent SDUs received at the source base station after the last SDU received in-order at the source base station from the mobile device; and
determining one or more missing SDUs based on the indication of the first missing SDU and a highest index of the two or more subsequent SDUs.

2. The method of claim 1, further comprising receiving, from the source base station, the two or more subsequent SDUs.

3. The method of claim 2, further comprising awaiting reception of the one or more missing SDUs and then delivering ordered data packets to an upper layer.

4. The method of claim 3, wherein the one or more missing SDUs comprises SDUs between the first missing service data unit (SDU) and the highest index of the two or more subsequent SDUs.

5. The method of claim 4, wherein the indication of the first missing SDU comprises the index of the first missing SDU.

6. The method of claim 1, wherein determining the one or more missing SDUs comprises determining the highest index associated with the two or more subsequent SDUs.

7. The method of claim 1, wherein the indication of the first missing SDU and the indication of the two or more subsequent SDUs are received from the source base station as part of a context transfer related to a handover of the mobile device from the source base station for the related mobile device.

8. The method of claim 7, wherein the index of a first missing SDU corresponds to the index associated with packets received by the source base station.

9. The method of claim 8, further comprising reordering the two or more subsequent SDUs with the one or more missing SDUs and interpreting data within the two or more subsequent SDUs and the one or more missing SDUs.

10. The method of claim 1, further comprising informing the mobile device of the one or more missing SDUs.

11. A wireless communications apparatus, comprising:
a memory; and
at least one processor coupled to the memory, and configured to:
receive, from a source base station, an indication of a first missing service data unit (SDU), wherein the first missing SDU is subsequent to a last SDU received in-order at the source base station from a mobile device;
receive, from the source base station, an indication of two or more subsequent SDUs received at the source base station after the last SDU received in-order at the source base station from the mobile device; and
determine one or more missing SDUs based on the indication of the first missing SDU and a highest index of the two or more subsequent SDUs.

12. The apparatus of claim 11, wherein the at least one processor is further configured to receive, from the source base station, the two or more subsequent SDUs.

13. The apparatus of claim 12, wherein the at least one processor is further configured to await reception of the one or more missing SDUs and then deliver ordered data packets to an upper layer.

14. The apparatus of claim 11, wherein determining the one or more missing SDUs comprises determining the highest index of the two or more subsequent SDUs received at the source base station.

15. The apparatus of claim 14, wherein the one or more missing SDUs comprises SDUs between the first missing SDU and the highest index of the two or more subsequent SDUs.

16. The apparatus of claim 11, wherein the indication of the first missing SDU and indication of the two or more subsequent SDUs are received from the source base station as part of a context transfer related to a handover of the mobile device from the source base station.

17. The apparatus of claim 16, wherein the indication of the first missing SDU comprises the index of the of the first missing SDU.

18. The apparatus of claim 17, wherein the index of a first missing SDU corresponds to the index associated with packets received by the source base station.

19. The apparatus of claim 11, wherein the at least one processor is further configured to informing the mobile device of the one or more missing SDUs.

20. A wireless communications apparatus that manages data packets associated with a handover of a mobile device to a target base station in wireless communication networks, comprising:
- means for receiving, from a source base station, an indication of a first missing service data unit (SDU), wherein the first missing SDU is subsequent to a last SDU received in-order at the source base station from a mobile device;
- means for receiving, from the source base station, an indication of two or more subsequent SDUs received at the source base station after the last SDU received in-order at the source base station from the mobile device; and
- means for determining one or more missing SDUs based on the indication of the first missing SDU and a highest index of the two or more subsequent SDUs.

21. A computer program product, stored on a non-transitory computer-readable medium, and comprising code for causing at least on processor to:
- receive, from a source base station, an indication of a first missing service data unit (SDU), wherein the first missing SDU is subsequent to a last SDU received in-order at the source base station from a mobile device;
- receive, from the source base station, an indication of two or more subsequent SDUs received at the source base station after the last SDU received in-order at the source base station from the mobile device; and
- determine one or more missing SDUs based on the indication of the first missing SDU and a highest index of the two or more subsequent SDUs.

* * * * *